United States Patent
Zihnioglu

(10) Patent No.: US 11,575,655 B2
(45) Date of Patent: Feb. 7, 2023

(54) ENDPOINT BYPASS IN A PROXY NETWORK

(71) Applicant: Webshare Software Company, Walnut, CA (US)

(72) Inventor: Asim Utku Zihnioglu, Walnut, CA (US)

(73) Assignee: Webshare Software Company, Covina, CA (US)

( * ) Notice: Subject to any disclaimer, the term of this patent is extended or adjusted under 35 U.S.C. 154(b) by 246 days.

(21) Appl. No.: 17/070,761

(22) Filed: Oct. 14, 2020

(65) Prior Publication Data

US 2022/0116362 A1 Apr. 14, 2022

(51) Int. Cl.
*H04L 9/40* (2022.01)
*G06F 9/455* (2018.01)
*H04L 67/60* (2022.01)
*H04L 67/56* (2022.01)

(52) U.S. Cl.
CPC ...... *H04L 63/0281* (2013.01); *G06F 9/45558* (2013.01); *H04L 63/029* (2013.01); *G06F 2009/45595* (2013.01)

(58) Field of Classification Search
CPC ... H04L 63/0281; H04L 63/029; H04L 67/60; H04L 67/56; G06F 9/45558; G06F 2009/45595
See application file for complete search history.

(56) References Cited

U.S. PATENT DOCUMENTS

| | | | |
|---|---|---|---|
| 9,742,866 B2 | 8/2017 | Shribman et al. | |
| 2004/0054805 A1* | 3/2004 | Sen | H04L 65/1036 709/240 |
| 2008/0101340 A1* | 5/2008 | Bernath | H04L 12/1457 370/352 |
| 2010/0153523 A1* | 6/2010 | Li | H04L 45/00 709/228 |
| 2012/0051261 A1 | 3/2012 | Subramanian et al. | |
| 2014/0259158 A1* | 9/2014 | Brown | H04L 63/1416 726/22 |
| 2016/0149811 A1 | 5/2016 | Roch et al. | |
| 2017/0279803 A1 | 9/2017 | Desai et al. | |
| 2022/0038586 A1* | 2/2022 | Sako | H04N 1/00244 |

OTHER PUBLICATIONS

European Patent Office, "Search Report" in application No. 20202784. 3-1213, dated Dec. 18, 2020, 10 pages.
European Claims in application No. 20202784.3-1213, dated Dec. 2020, 6 pages.

* cited by examiner

*Primary Examiner* — Alina A Boutah
(74) *Attorney, Agent, or Firm* — Hickman Becker Bingham Ledesma LLP; Malgorzata A. Kulczycka

(57) ABSTRACT

A computer system providing a methodology for bypassing an endpoint in a proxy network. The system and method reduce the number of endpoints in the proxy network between a source computer and a target computer through which network packets must traverse, thereby reducing the latency of information transfer between the source and target computers.

20 Claims, 16 Drawing Sheets

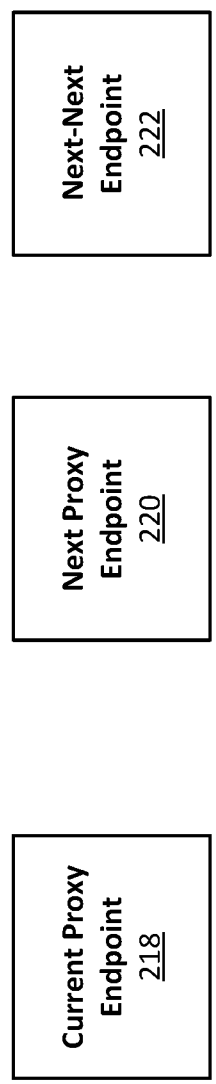

ENDPOINT BYPASS IN A PROXY NETWORK

TECHNICAL FIELD

The present disclosure relates to computer networking. More specifically, some embodiments of the present disclosure relate to bypassing endpoints in a proxy network.

BACKGROUND

Computer networks are very powerful tools for transmitting information between computers. Computer network proxy server computers ("proxy servers") are a common mechanism for transmitting information between computers using a computer network while providing additional useful functionality. A typical proxy server receives "request" data from the network sent from "source" computers and sends the request data over the network to "target" computers. In response to sending the request data to the target computers, the proxy server also receives "response" data from the network sent from the target computers and sends the response data to the source computers over the network. As an example, a "Web" proxy server on the Internet may receive a Hypertext Transfer Protocol (HTTP) request from a source computer and send the HTTP request to a target computer. In response to sending the HTTP request to the target computer, the Web proxy server may receive a HTTP response from the target computer. The HTTP response received by the Web proxy server from the target computer may then be sent to the source computer.

Between the source computer and the target computer in the computer network, a proxy server is typically provided as an intermediate network endpoint that connects the source computer to the target computer. In essence, the proxy server shields the target computer user from knowing or even caring about the network address identity of the source computer. Typically, all network requests sent from the source computer to access information from the target computer are sent through the proxy server and all network responses to those requests sent from the target computer are sent back through the proxy server to the source computer. For example, information may be obtained from the target computer at the source computer, all without target computer knowing or obtaining the network address of the source computer. In this manner, the proxy server functions as an intermediary for network requests from source computers seeking information from target computers that provide that information. The general construction and operation of proxy servers on the Internet is described, for example, in Luotonen, A. and Altis, K., "World-Wide Web proxies," Computer Networks and ISDN Systems, November 1994, the entire contents of which is hereby incorporated by reference.

As indicated, one purpose of a proxy server can be to hide the identity of the network address of the source computer from the target computer. A network address may be defined as an identifier of a computer in a computer network and is used to route network packets within the computer network from a source in the network to a destination in the network. Such a network packet usually includes in its network packet headers a "source" network address that is a network address of the source in the network and a "destination" network address that is a network address of the destination in the network. A network packet "header" is a portion of the network packet preceding the body of the packet that contains network addressing and other data required for the packet to reach its intended destination.

Consider, for example, the use of Internet Protocol (IP) network addresses and Transmission Control Protocol (TCP) connections in the proxy server context. As an example, the source computer establishes a TCP network connection with the proxy server. The proxy server also establishes a TCP network connection with the target computer. IP network packets sent from the source computer to the proxy server over the TCP network connection therebetween have a source network address of the source computer and a destination network address of the proxy server. However, when the network packets are sent from the proxy server to the target computer over the TCP network connection therebetween, the network packets have a source network address of the proxy server. As a result, it appears from the perspective of the target computer that the network packets are being sent from the proxy server. In this way, the proxy server is used to conceal the network address identity of the source computer from the target computer. The format of IP packets is described in, for example, Internet Engineering Task Force (IETF) Request for Comments (RFC) 791 Internet Standard, September 1981 (informally referred to as "IPv4"), and IETF RFC 2460 Draft Standard, December 1998 (informally referred to as "IPv6"), the entire contents of each of which is hereby incorporated by reference. TCP is described in, for example, IETF RFC 793 Internet Standard, September 1981 (informally referred to as "TCP"), the entire contents of which is hereby incorporated by reference.

In many situations there are multiple proxy servers interposed between the source computer and the target computer. Such a situation is common where proxy servers are used not only to conceal the network address of the source computer, but also to appear to the target computer that it is being accessed from a source computer in a particular geographic location. For example, a user of a source computer in Europe may wish to access a particular website as if the user was using the source computer on a computer network in the United States. In this case, the source computer in Europe may TCP connect to a VPN proxy server located in Europe. The VPN proxy server in Europe may connect to a SOCKS proxy server in the United States. The SOCKS proxy server may connect to a "datacenter" or a "residential" proxy server in the United States that has an IP network address allocated to a registrant in the United States. The datacenter or residential proxy server connects to a target computer of the website using the United States IP address as its source network address in network packets sent to the target computer. Since the IP packets sent from the datacenter or residential proxy server to the target computer have a source IP network address in the United States, the target computer may serve information and web pages, via the proxy servers, to the source computer in Europe as if it was being accessed by a source computer in the United States. This may be useful to the user of the source computer in Europe if, for example, the target computer would not serve the information and web pages to requesting source computers using source network addresses registered outside the United States. HTTP is an application-layer Internet protocol, an early version of which is documented in IETF RFC 2616, June 1999, the entire contents of which is hereby incorporated by reference. SOCKS is a session-layer Internet protocol for exchanging IP network packets between computers through a proxy server and is described in, for example, IETF RFC 1928, March 1996, the entire contents of which is hereby incorporated by reference.

One issue with using multiple proxy servers is increased network latency between the source computer and the target computer. In general, the more proxy servers interposed between the source computer and the target computer, the greater the latency for a request for information from the source computer to reach the target computer in the computer network and the greater the latency for the responsive information sent from the target computer to arrive at the source computer. This is because network packets must be received and processed at each of the multiple proxy servers before the network packet is passed on to the next endpoint and such receipt and processing introduces delay to the transmission of the network packet between the source and target computer. For service providers that provide proxy services as a service to users, minimizing network latency between the source and target computers can provide a competitive advantage.

The present disclosure addresses this and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Some embodiments of the present approach are illustrated by way of example, and not in way by limitation, in the figures of the accompanying drawings and in which like reference numerals refers to similar elements and in which.

DETAILED DESCRIPTION

Figure 1A:
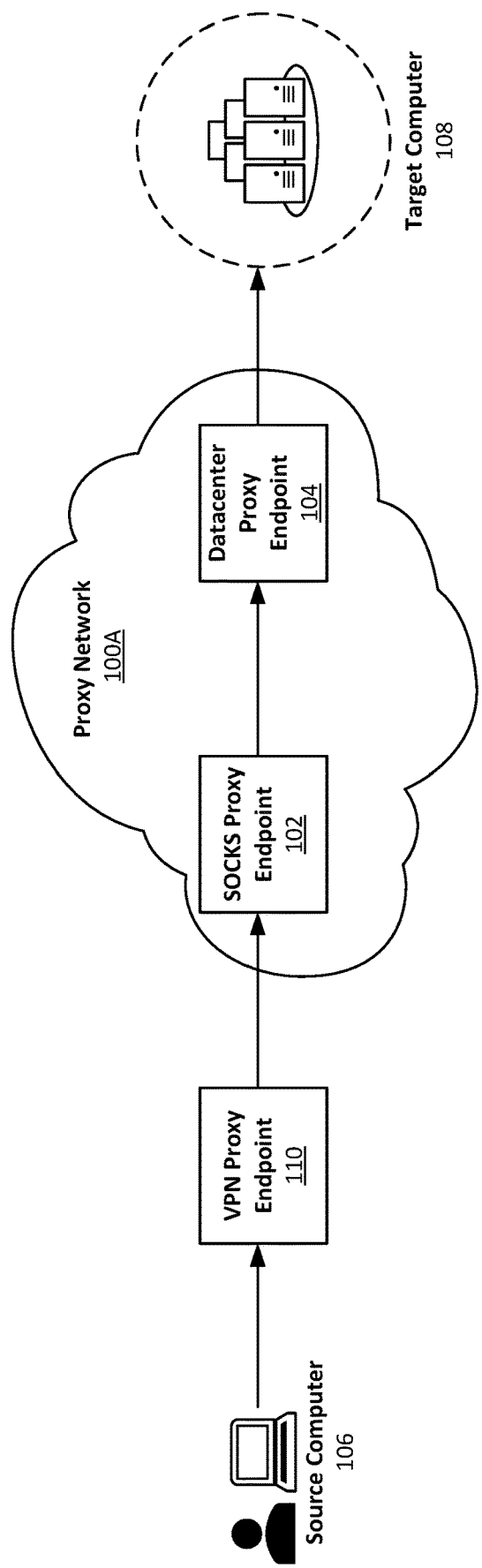
FIG. 1A, FIG. 1B, FIG. 1C, FIG. 1D, FIG. 1E, FIG. 1F, FIG. 1G, and FIG. 1H each depicts an example proxy network in which some embodiments are implemented.

In the following description, for the purposes of explanation, numerous specific details are set forth in order to provide a thorough understanding of some embodiments of the present approach. It will be apparent, however, that some embodiments may be practiced without these specific details. In other instances, well-known structures and devices are shown in block diagram form in order to avoid unnecessarily obscuring some embodiments.

The detailed description is organized below according to the following outline:
1.0 GLOSSARY
2.0 OVERVIEW OF ENDPOINT BYPASS IN A PROXY NETWORK
3.0 EXAMPLE PROXY NETWORKS
4.0 ENDPOINT BYPASS IN A PROXY NETWORK
4.1 SHARED NETWORK INTERFACE CO-LOCATION SCENARIO
4.2 SHARED HYPERVISOR CO-LOCATION SCENARIO
4.3 SHARED ROUTER CO-LOCATION SCENARIO
5.0 HARDWARE IMPLEMENTATION
6.0 OTHER ASPECTS OF THE DISCLOSURE

1. GLOSSARY

The following definitions are provided for purposes of illustration, not limitation, in order to assist with understanding the discussion that follows.

Application Container: An application container, or just "container," is a computer operating system mode of operation in which the operating system kernel allows the existence of multiple isolated user space instances to run on the kernel. The instances themselves are sometimes referred to as zones, virtual private servers, partitions, virtual environments, virtual kernels, or jails. Application containers provide a mechanism whereby finite hardware computing resources such as CPU time and storage media space can be allocated among the instances running in the container.

Application Layer: The application layer refers layer 7 of the OSI model for network communications.

Application Layer Proxy: An application layer proxy is a proxy capable of acting as an intermediary for application-layer network requests from endpoints seeking resources from other endpoints that provide those resources in application-layer responses.

Computer Network: A computer network, or just "network," refers broadly to a set of computer systems that use a set of common network communication protocols (e.g., IP) over digital interconnections for the purpose of sharing resource located at or provided by network nodes.

Computer System: As used herein, a computer system refers to a physical computer system including the hardware components thereof. An example computer system is described below with respect to FIG. 4.

Datacenter Proxy: A datacenter proxy is a proxy that uses a privately registered network address as a source network address in network packets sent from the datacenter proxy to an endpoint. A datacenter proxy is typically located in a datacenter facility or other computer and network hosting facility or building dedicated to hosting computer systems and providing high-bandwidth access to the Internet or other computer networks. The privately registered network address is typically registered by a corporation or business such as a proxy provider or a datacenter provider.

HTTP: HTTP stands for the hypertext transfer protocol. HTTP is an application layer protocol for distributed, collaborative, hypermedia information systems and is a foundation for data communications for the World Wide Web, where hypertext documents include hyperlinks to other resources that the user can easily access, for example by a mouse click or by tapping the screen in a web browser. Reference herein to "HTTP" is intended generally to encompass both its unencrypted variant and its encrypted variants such as, for example, HTTP over Transport Layer Security (TLS) and HTTP over Secure Sockets Layer (SSL), unless the context clearly indicates otherwise.

HTTP Proxy: A HTTP proxy is a proxy that implements the HTTP network protocol.

Hypervisor: A hypervisor is computer software, firmware or hardware that creates and runs virtual machines. A hypervisor can be a Type-1 or Type-2 hypervisor, although the distinction between the two types is not always clear. A Type-1 hypervisor runs on a computer system to control the computer system hardware and to "host" and manage "guest" virtual machines that run on the Type-1 hypervisor. A Type-2 hypervisor runs a conventional "host" operating system and virtual machines run as "guest" processes on the operating system host. Reference herein to "hypervisor" is intended generally to encompass both Type-1 and Type-2 hypervisors, unless the context clearly indicates otherwise.

Internet Protocol: The Internet Protocol, or just "IP," is the principal communications protocol in the Internet protocol suite for relaying network packets across computer network boundaries. Currently, the Internet uses two different versions of IP referred to as IPv4 and IPv6, respectively. Reference herein to "IP" is intended generally to encompass both IPv4 and IPv6, unless the context clearly indicates otherwise.

Network Address: A network address identifies an endpoint in a computer network at the network layer. An IPv4 address and an IPv6 address are each an example of a network address.

Network Connection: A network connection is a mode of network communication between two endpoints in a computer network where a communication session is established between the two endpoints before a stream of user data is transmitted between the endpoints. The communication session may allow the stream of user data to be delivered to the receiving endpoint in the same order it was sent from the sending endpoint. A TCP connection is an example of a network connection.

Network Endpoint: A network endpoint, or just "endpoint," is a network-connected and network layer-addressable computer system, virtual machine, application container, or a process or set of processes executing on any of a computer system, virtual machine, or application container.

Network Interface: A network interface is a software, firmware or hardware-implemented interface between endpoints in a computer network providing network functions such as a point of interconnection, passing messages, connecting and disconnecting, etc. A network interface is typically associated with one or more network addresses.

Network Layer: The network layer refers to layer 3 of the OSI model for network communications.

Network Packet: A network packet, or just "packet," is a formatted unit of data carried by a computer network. A packet includes control information and user data. The user data is sometimes referred to as the payload of the packet. The control information provides data for delivering the payload such as source and destination network addresses, error detection codes or sequencing information. The control information is sometimes referred to as the packet "header," as the control information typically precedes the payload in the packet. However, some or all of the control information can be present following the payload in a packet. A common type of network packet is an IP packet in which the control information includes source and destination IP addresses.

Residential Proxy: A residential proxy is a proxy that uses a network address registered to a residential or commercial Internet Service Provider (ISP) as the source network address in network packets sent from the residential proxy to an endpoint. A residential proxy is typically located in a home or other location where connectivity to the Internet is provided by the ISP.

Router: A router is a computer network device that forwards network packets between computer networks.

Proxy: An endpoint in a computer network that acts as an intermediary for requests from endpoints seeking resources from other endpoints that provide those resources.

Session Layer: The session layer refers to layer 5 of the Open Systems Interconnection (OSI) model for network communications.

SOCKS: SOCKS is a session layer Internet protocol for exchanging network packets between endpoints through a proxy.

SOCKS proxy: A SOCKS proxy is a proxy that implements the SOCKS network protocol.

TCP: TCP refers to the Transmission Control Protocol and is one of the main protocols of the Internet protocol suite. TCP is a connection-oriented protocol and provides reliable, ordered and error-checked delivery of a stream of bytes between endpoints in a computer network. Because TCP is connection-oriented, a connection must be established between endpoints before user data can be sent between the endpoints. Such establishment typically occurs through what is sometimes referred to as a three-way handshake between the endpoints.

Virtual Machine: A virtual machine is an emulation of a computer system that runs on a computer system with the aid of a hypervisor.

VPN: VPN stands for virtual private network. A VPN extends a private network across a public network such as the Internet and enables endpoints to send and receive data across the public network as if the endpoints were connected on the private network. A VPN typically involves establishing a virtual point-to-point connection between endpoints and securing data transmitted via the connection using cryptographic encryption.

VPN proxy: A VPN proxy is a proxy that implements a VPN between it and another endpoint.

The foregoing and other embodiments will now be described in greater detail with respect to the figures.

2. OVERVIEW OF ENDPOINT BYPASS IN A PROXY NETWORK

Some embodiments of the present approach comprise a computer system providing a methodology for bypassing an endpoint in a proxy network. The embodiments reduce the number of endpoints in the proxy network between the source computer and the target computer through which network packets must traverse, thereby reducing the latency of information transfer between the source and target computers.

The general approach of the embodiments provides for a "current" proxy endpoint in a proxy network to determine whether it and a "next" proxy endpoint in the proxy network are co-located together. There are at least three different co-location scenarios. One, the proxy endpoints are determined to be co-located together because they use the same network interface. Two, the proxy endpoints are determined to be co-located together because they execute in different virtual machines but on the same hypervisor. Three, the proxy endpoints are determined to be co-located because they are run on two different computer systems but are in the proxy network behind the same router. If the current proxy endpoint determines that it and the next proxy endpoint are co-located, then the current proxy endpoint bypasses the next proxy endpoint to exchange network packets with the "next-next" endpoint that the next proxy endpoint would have exchanged network packets with if it were not bypassed by the current proxy endpoint. Note that a penultimate endpoint may bypass the last endpoint to directly connect to a target computer. By doing so, the next proxy is removed from the chain of next network hops from the source computer to the target computer thereby reducing the latency that the proxy network adds to transfer of information as carried in network packets between the source and target computers.

3. EXAMPLE PROXY NETWORK

Before describing the embodiments in greater detail, example proxy networks in which the embodiments may be implemented will be described. FIG. 1A is high-level block diagram illustrating components of a proxy network 100A in which the embodiments may be implemented. As shown, the proxy network includes SOCKS proxy endpoint 102 and datacenter proxy endpoint 104. Also shown are source computer 106, target computer 108 and VPN proxy endpoint 110.

In FIG. 1A, the arrows between the various endpoints represent the direction in which network connections are initiated. For example, SOCKS proxy endpoint 102 initiates a network connection with datacenter proxy endpoint 104 as indicated by the arrow from SOCKS proxy endpoint 102 to datacenter proxy endpoint 104. However, network packets can flow in both directions over the network connection and network packet flow is not limited to the direction depicted by the arrows.

Proxy network 100A is operated by a proxy service provider. For example, the proxy service provider may be a datacenter proxy service provider or a residential proxy service provider. Although just a single SOCKS proxy endpoint and a single datacenter proxy endpoint are shown, proxy network 100 may encompass many proxy endpoints in datacenters around the world. A purpose of the proxy provider providing and putting proxy endpoints into service in datacenters around the globe is for the proxy provider to be able to offer to its users the ability to access target computers using network addresses registered in different countries or jurisdictions. This is useful to circumvent network firewall restrictions that prevent access to target computers by source computers that have a source network address registered in a prohibited or unauthorized country or geographic area.

While only a single source computer 106 and a single target computer 108 are depicted in FIG. 1A for purposes of providing a clear example, proxy network 100A can be used to connect many source computers to many target computers. Thus, source computer 106 is intended to be viewed as generally representative of any such source computer and target computer 108 is intended to be viewed as generally representative of any such target computer.

In some embodiments, source computer 106 is an end-user personal computing device such as laptop computer, a desktop computer, a workstation computer, a tablet computing device or a portable electronic computing device such as a smart phone, and target computer 106 is an application server computer or network computing device such as one that implements a website or other online service in conjunction with other target computers. However, source computer 106 could also be an application server computer or network computing device and does not need to be an end-user personal computing device. More generally, no particular type of computing device or network device is required for source computer 106 or target computer 108.

Reference is made herein to a "registered" network address. A registered network address encompasses a network addresses assigned to an organization by a regional Internet registry such as the African Network Information Center (AFRINIC), the American Registry for Internet Numbers (ARIN), the Asia-Pacific Network Information Centre (APNIC), the Latin America and Caribbean Network Information Centre (LACNIC), and the Réseaux IP Européens Network Coordination Centre (RIPE NCC). The organization may itself be a local Internet Registry such as a corporation, an Internet Service Provider (ISP) or an academic institution that is assigned a block of network addresses by a regional Internet registry. The organization may in turn assign some or all its assigned block to another organization such as, for example, a proxy provider. Network address geolocation databases and services exist for resolving a given network address to the geographic region in which it is registered. The geographic region information provided by such databases and services for a given network address may be hierarchical. For example, a given network address may be registered in North America (continent), in the United States (country), in California (state/region), in San Francisco (city), and in postal code 94109. Target computer 108 may use such geolocation databases and services to block incoming network packets having a source network address that is not registered in a set of authorized geographic regions. For example, target computer 108 may block network packets with source network address registered in certain unauthorized geographic regions.

For example, target computer 108 may be part of a website that uses a network firewall to restrict access to the website to only source network addresses registered in the United States. In that case, if source computer 106 uses a network address registered in a European country, source computer 106 cannot directly connect to target computer 108. The network firewall would prevent the direct network connection because the source network address of the network connection is not registered in the United States. However, source computer 106 can access the website using proxy network 100.

It should be noted that geolocation databases and services and geolocation of network address generally may be used for purposes other than blocking access to a target computer. For example, a website may serve different content depending on the geolocation of the source network address. For example, users that connect to a website using a source network address registered in Europe may receive different content than users that connect to the website using a source network address registered in the United States.

Source computer 106 can access target computer 106 using proxy network 100 with a source network address from a selected geographic area. To do so, source computer 106 may establish a network connection with VPN proxy endpoint 110. Typically, the network connection is over a public network such as the Internet. Hence, VPN proxy endpoint 110 may be used to secure the network connection and keep the contents of the information transmitted via the network connection hidden from other users and computers that have access to the public network.

As part of establishing or after establishing the network connection, source computer 106 may generally specify a "target" network address of target computer 108. For example, source computer 106 may specify a domain name, website name or other network address of a website. Target computer 108 may, at least in part with other computers, implement the web site.

In addition, source computer 106 may specify a "target" geographic area which may be a continent, country, city, region or state, or postal code. The target geographic area represents the desired geographic network address area from which requests for information from source computer 106 of target computer 108 are to appear to target computer 108. Specifically, the target geographic area is used to select the network address to use as the source network address when datacenter proxy endpoint 106 connects and sends network packets to target computer 108. The network address selected is one registered in the target geographic area. For example, returning to the United States website example above, source computer 106 may specify the United States as the target geographic area. In this case, the network connection between datacenter proxy endpoint 104 and target computer 108 and network packets sent from datacenter proxy endpoint 104 to target computer 108 will have a source network address registered in the United States despite the source network address of source computer 106 being registered in Europe.

In conjunction with establishing or after establishing the network connection between source computer 106 and VPN proxy endpoint 110, VPN proxy endpoint 110 establishes a network connection with SOCKS proxy endpoint 102. Proxy network 100 may encompass multiple SOCKS proxy endpoints located in different datacenters around the globe. VPN proxy endpoint 110 may select one of the available SOCKS proxy endpoints that is geographically located in the target geographic area. For example, returning to the United States website example, VPN proxy endpoint 110, which may be located in Europe nearer to source computer 102, may select a SOCKS proxy endpoint located in the United States.

Alternatively, a centralized proxy coordinator system (not shown) in proxy network 100 may assign SOCKS proxy endpoint 102 to VPN proxy endpoint 110. In this alternative, in conjunction with establishing or after establishing the network connection between source computer 106 and VPN proxy endpoint 110, the VPN proxy endpoint 110 may contact the coordinator system providing the target geographic area and request a SOCKS proxy endpoint assignment for the target geographic area. In response, the coordinator system may provide a network address of SOCKS proxy endpoint 102. The coordinator system may select SOCKS proxy endpoint 102 to assign to VPN proxy endpoint 110, from among a set of available SOCKS proxy endpoints, based on SOCKS proxy endpoint 102 being in the target geographic region. VPN proxy endpoint 110 may use the provided network address to establish a network connection with SOCKS proxy endpoint 102.

In conjunction with establishing or after establishing the network connection between VPN proxy endpoint 110 and the SOCKS proxy endpoint 102, SOCKS proxy endpoint 102 establishes a network connection with datacenter proxy endpoint 104. Proxy network 100 may encompass multiple datacenter proxy endpoints located in different datacenters around the globe. SOCKS proxy endpoint 102 may select one of the datacenter proxy endpoints having a network address registered in the target geographic area. For example, returning to the United States website example, SOCKS proxy endpoint 102 may select an available datacenter proxy endpoint having a network address registered in the United States.

Alternatively, the centralized proxy coordinator system may assign datacenter proxy endpoint 104 to SOCKS proxy endpoint 102. In this alternative, in conjunction with establishing or after establishing the network connection between VPN proxy endpoint 110 and SOCKS proxy endpoint 102, SOCKS proxy endpoint 102 may contact the coordinator system providing the target geographic area and request a datacenter proxy endpoint assignment for the target geographic area. In response, the coordinator system may provide a network address of datacenter proxy endpoint 104. The coordinator system may select datacenter proxy endpoint 104 to assign to SOCKS proxy endpoint 102, from among a set of available datacenter proxy endpoints, based on datacenter proxy endpoint 104 having a network address registered in the target geographic region. SOCKS proxy endpoint 102 may then use the provided network address to establish a network connection with datacenter proxy endpoint 104.

In conjunction with establishing or after establishing the network connection between SOCKS proxy endpoint 102 and the datacenter proxy endpoint 104, datacenter proxy endpoint 104 establishes a network connection with target computer 108. Datacenter proxy endpoint 104 may obtain the target network address of target computer 108 from SOCKS proxy endpoint 104 or from the centralized proxy coordinator system.

Once all these network connections are established, network packets sent from source computer 106 to target computer 108 traverse proxy network 100, including VPN proxy endpoint 110, SOCKS proxy endpoint 102 and datacenter proxy endpoint 104, on their way to target computer 108. Likewise, for network packets sent from target computer 108 toward source computer 106. However, target computer 108 does not receive the network address of source computer 104 in the network packets sent to it by datacenter endpoint proxy 104. Instead, those network packets contain the network address of the datacenter endpoint proxy 104. Further, because of proxy network 100, target computer 108 can send network packets toward source computer 106 that reach source computer 106 without having to use the network address of source computer 106. In this way, the network address identity of source computer 106 is not revealed to target computer 108.

The above-described computer hardware and software are presented for purposes of illustrating the basic underlying components that may be employed in a proxy network. The present approach, however, is not limited to any particular proxy network configuration. In particular, the particular types of proxy endpoints shown in FIG. 1 are not necessary to the approach but are used to provide a framework for discussion. Instead, the present approach may be implemented in any type of proxy network capable of supporting the methodologies of an embodiment.

For example, FIG. 1B, FIG. 1C, FIG. 1D, FIG. 1E, FIG. 1F, FIG. 1G, FIG. 1H each depict a variation of a proxy network, in which the embodiments may be implemented.

Figure 1B:
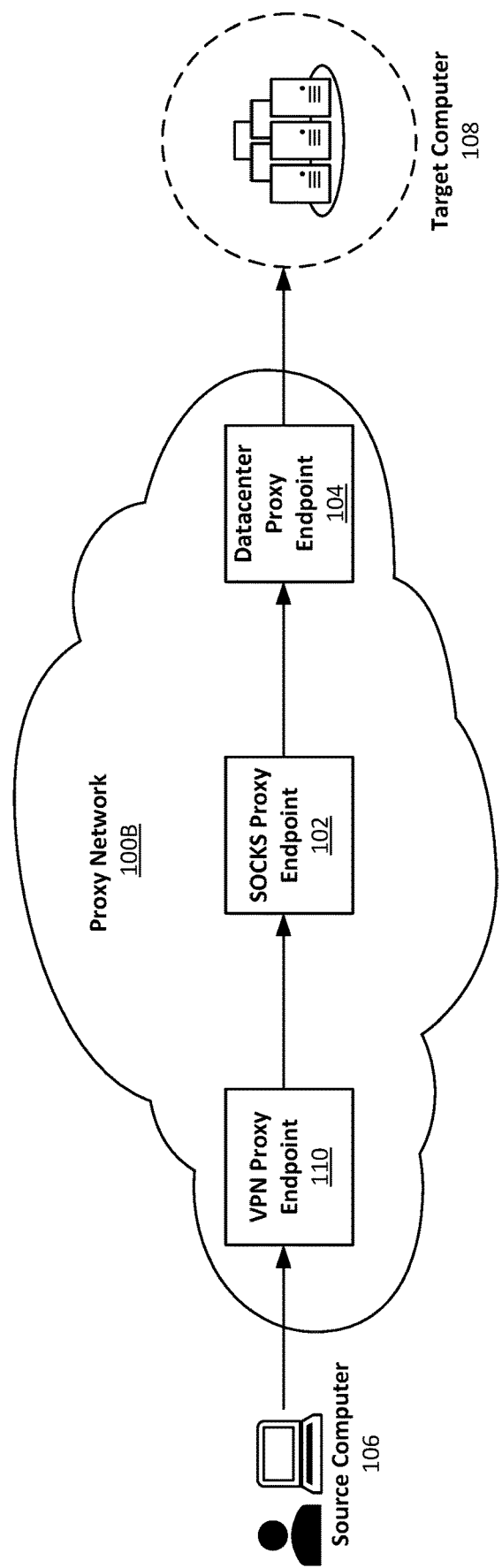

In proxy network 100B of FIG. 1B, as a variation of proxy network 100A of FIG. 1A, the VPN proxy endpoint 110 is part of the proxy network. For example, the proxy provider may operate VPN proxy endpoint 110 are part of the proxy network. In contrast, in proxy network 100A of FIG. 1A, VPN proxy endpoint 110 may be operated by a different provider than proxy provider such as a VPN provider. In a case where VPN proxy endpoint and proxy network are provided by different providers, proxy provider may put the proxy network into service such that the VPN provider can interoperate their VPN proxy endpoints with proxy network. For example, the proxy provider may implement the proxy network to offer network application programming interface (APIs) to VPN proxy endpoints, or proxy provider use standard network protocols that allow interoperability by VPN proxy endpoints and the proxy network.

Figure 1C:
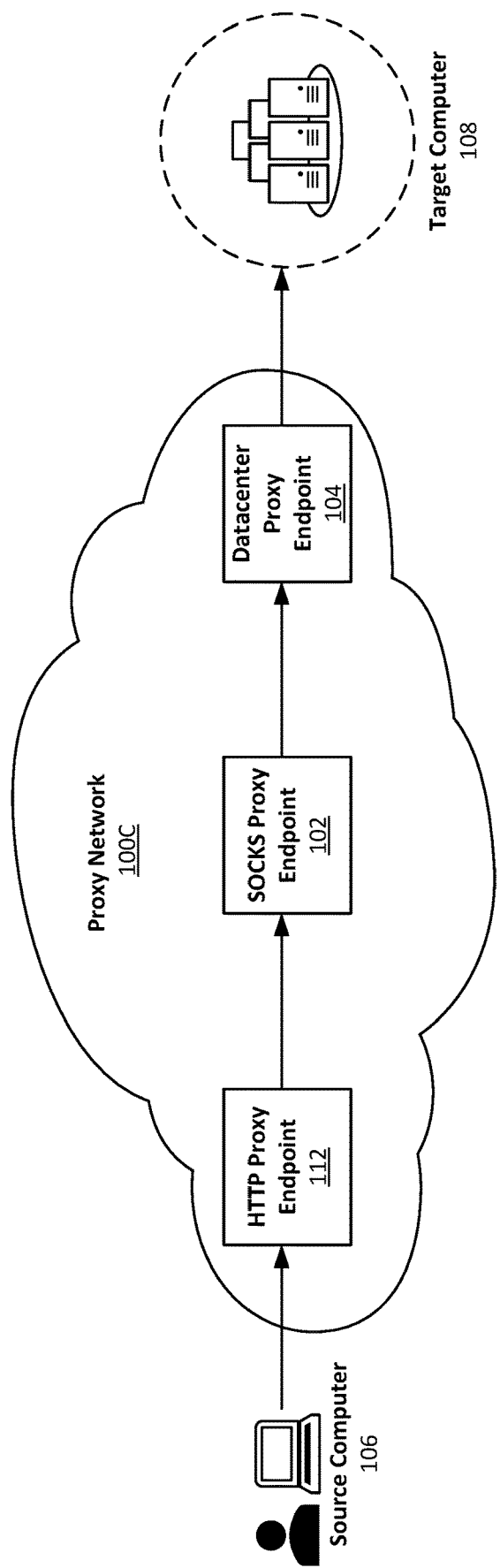

In proxy network 100C of FIG. 1C, as a variation of proxy network 100A of FIG. 1A, source computer 106 establishes a network connection with HTTP proxy endpoint 112 in proxy network 100C instead of with a VPN proxy endpoint.

Figure 1D:
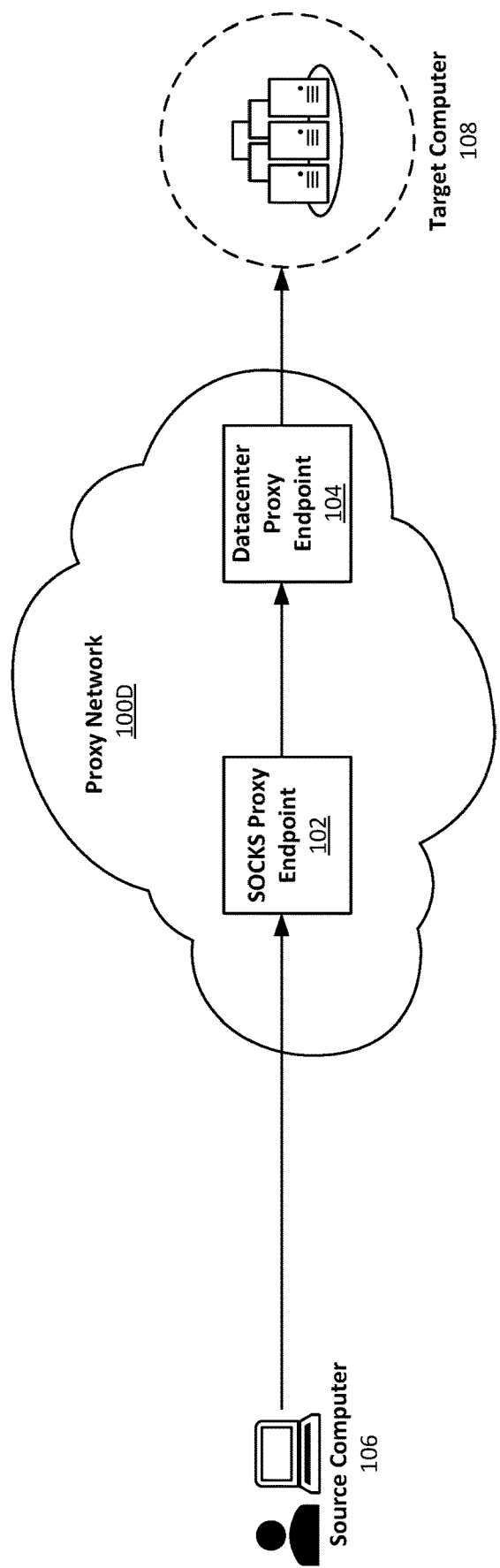

In proxy network 100D of FIG. 1D, as a variation of proxy network 100A of FIG. 1A, source computer 106 establishes a network connection with SOCKS proxy endpoint 102 in proxy network 100D instead of with a VPN proxy endpoint.

Figure 1E:
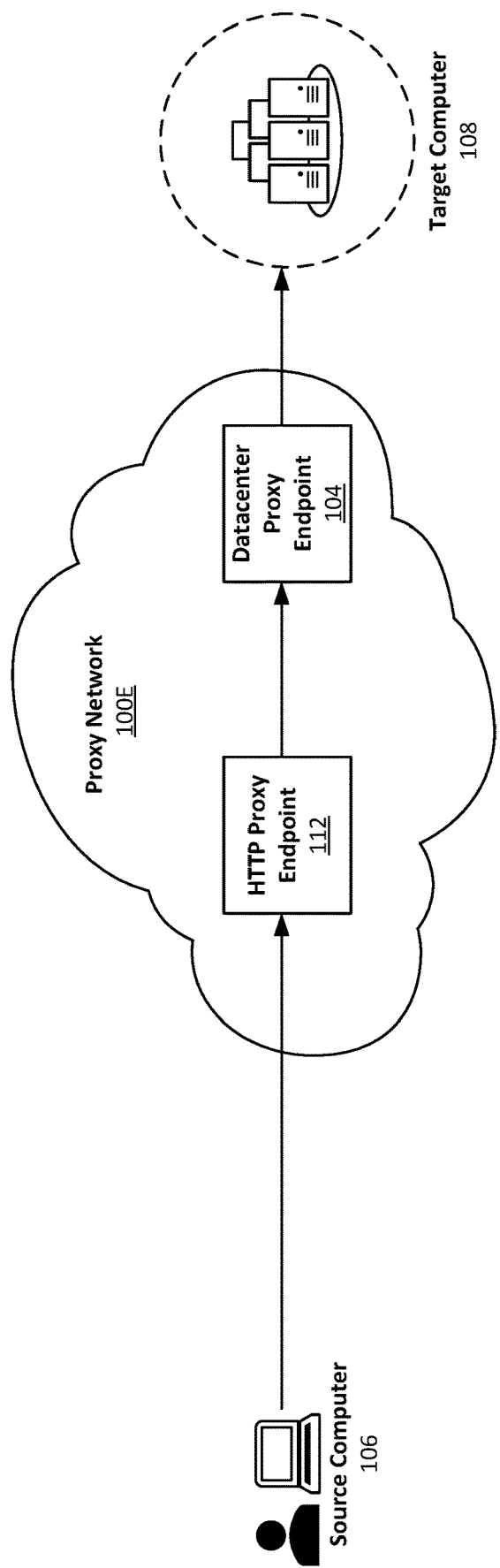

In proxy network 100E of FIG. 1E, as a variation of proxy network 100A of FIG. 1A, source computer 106 establishes a network connection with HTTP proxy endpoint 112 in proxy network 100E instead of with a VPN proxy endpoint. A SOCKS proxy endpoint is not used.

Figure 1F:
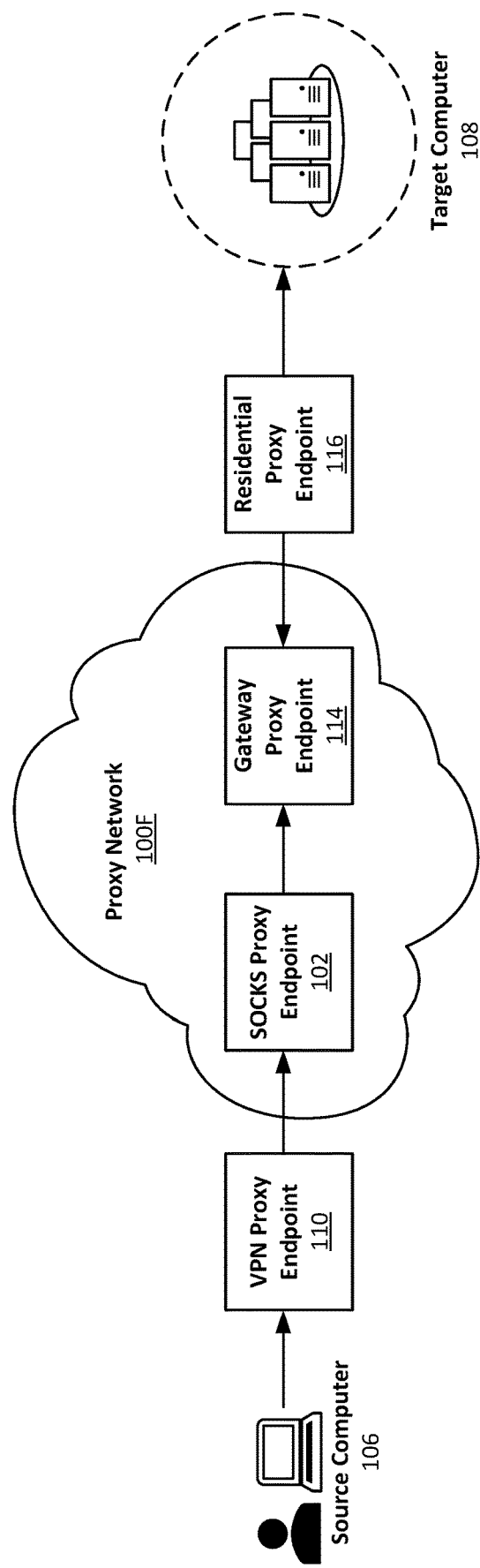

Proxy network 100F of FIG. 1F is a residential proxy variation of proxy network 100A of FIG. 1A. Residential proxy endpoint 116 establishes a network connection with residential proxy gateway endpoint 114 in proxy network 100F. Gateway endpoint 114 is provided so that residential proxy endpoint 116 can operate as a residential proxy even if residential proxy endpoint 116 is behind a network firewall that prevents endpoints in proxy network 100F from initiating network connection establishment with residential proxy endpoint 116 from outside the network firewall. Instead, residential proxy endpoint 116 initiates the network connection establishment with gateway endpoint 114 from inside (behind) the network firewall where such outbound network connection initiation is typically allowed by the network firewall that protects residential proxy endpoint 116. Likewise, residential proxy endpoint 116 can initiate and establish a network connection with target computer 108. Network packets can flow between source computer 106 and target computer 108 through proxy network 100F.

Figure 1G:
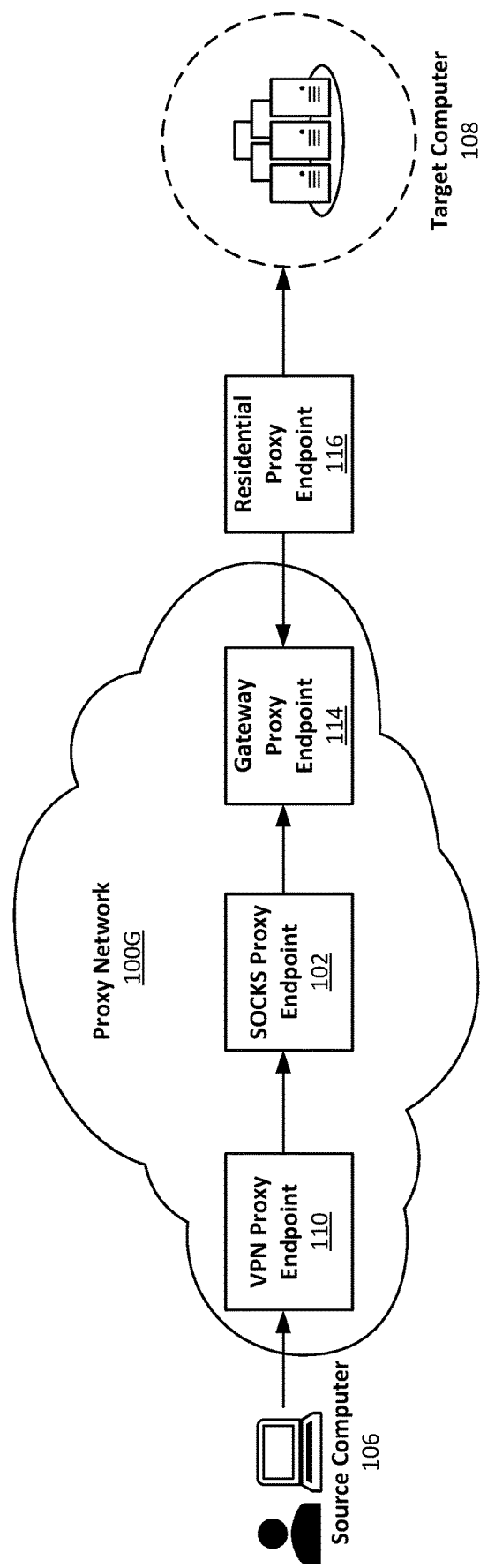

In proxy network 100G of FIG. 1G, as a variation of proxy network 100F of FIG. 1F, the VPN proxy endpoint 110 is part of proxy network 100G.

Figure 1H:
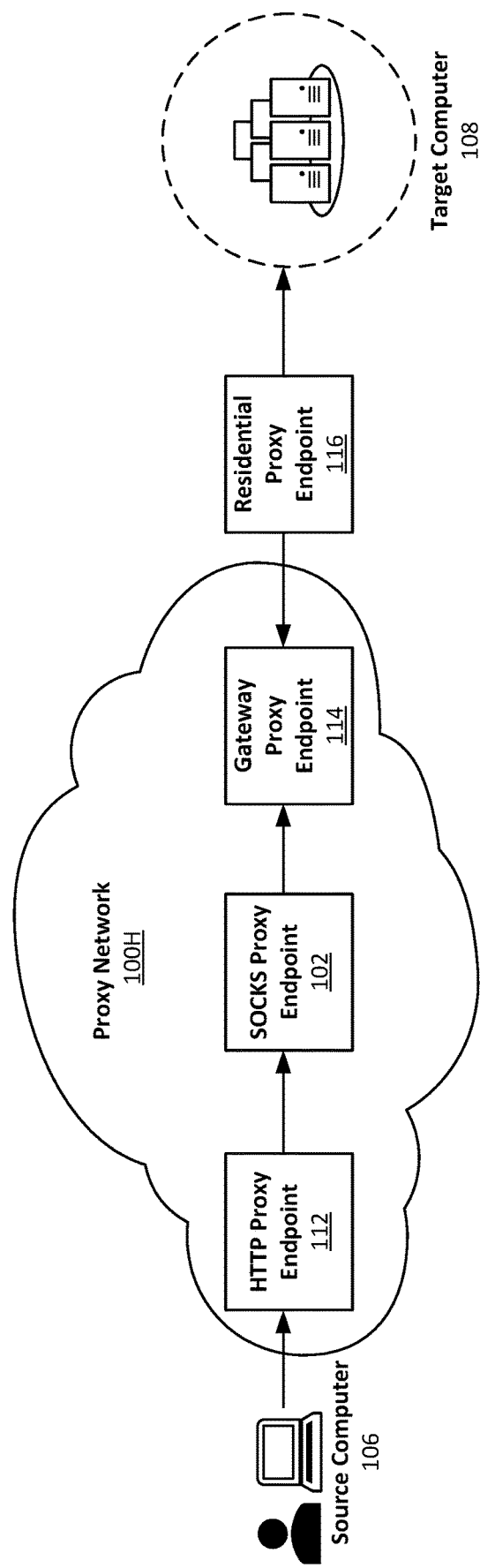

In proxy network 100H of FIG. 1H, as a variation of proxy network 100F of FIG. 1F, source computer 106 establishes a network connection with HTTP proxy endpoint 112 in proxy network 100H instead of with a VPN proxy endpoint.

4. ENDPOINT BYPASS IN A PROXY NETWORK

Figure 2B:
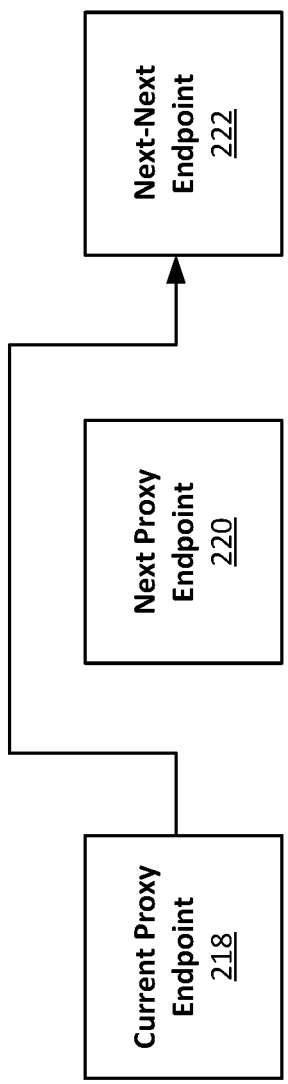
FIG. 2A, FIG. 2B, FIB. 2C, FIG. 2D each depicts various states in a proxy network, according to some embodiments.
Figure 2C:
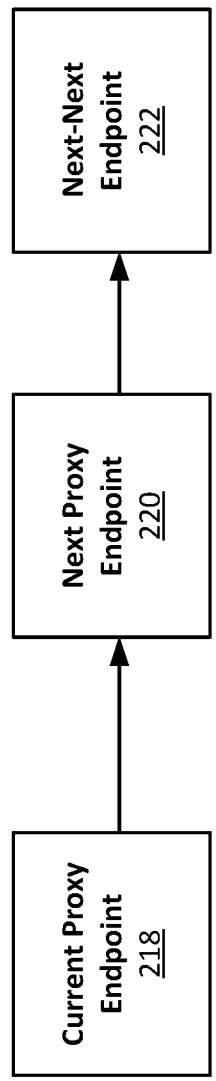
Figure 2D:
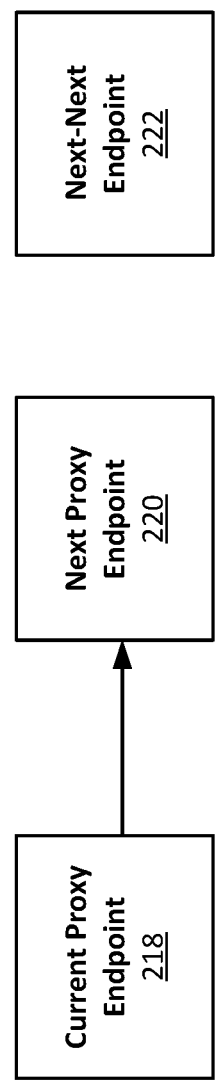

FIG. 2A, FIG. 2B, FIG. 2C, FIG. 2D each depict a different state in a proxy network, according to some embodiments of the present approach. FIG. 2A depicts a "pre-flow" state in the proxy network before network packets can flow between source computer 106 and target computer 108 through the proxy network (e.g., before a network packet sent from one of source computer 106 or target computer 108 can reach the other through the proxy network). FIG. 2B depicts a "bypass" state of the proxy network when network packets flow between source computer 106 and target computer 108 through the proxy network including between current proxy endpoint 218 and next-next endpoint 222 bypassing next proxy endpoint 220. FIG. 2C depicts a "non-bypass" state of the proxy network when network packets flow between source computer 106 and target computer 108 through the proxy network including through all of current proxy endpoint 281, next proxy endpoint 220 and next-next endpoint 222. FIG. 2D depicts an alternative "pre-flow" state in the proxy network before network packets can flow between source computer 106 and target computer 108 through the proxy network.

In the context of proxy network 100A of FIGS. 1A and 1n the context of proxy network 100B of FIG. 1B, current proxy endpoint 218, next proxy endpoint 220 and next-next endpoint 222 can be VPN proxy endpoint 110, SOCKS proxy endpoint 102 and datacenter proxy endpoint 104, respectively. Alternatively, in the context of proxy network 100A of FIGS. 1A and 1n the context of proxy network 100B of FIG. 1B, current proxy endpoint 218, next proxy endpoint 220 and next-next endpoint 222 can be SOCKS proxy endpoint 102, datacenter proxy endpoint 104 and target computer 108, respectively.

In the context of proxy network 100C of FIG. 1C, current proxy endpoint 218, next proxy endpoint 220 and next-next endpoint 222 can be HTTP proxy endpoint 112, SOCKS proxy endpoint 102 and datacenter proxy endpoint 104, respectively. Alternatively, in the context of proxy network 100C of FIG. 1C, current proxy endpoint 218, next proxy endpoint 220 and next-next endpoint 222 can be SOCKS proxy endpoint 102, datacenter proxy endpoint 104 and target computer 108, respectively.

In the context of proxy network 100D of FIG. 1D, current proxy endpoint 218, next proxy endpoint 220 and next-next endpoint 222 can be SOCKS proxy endpoint 102, datacenter proxy endpoint 104 and target computer 108, respectively.

In the context of proxy network 100E of FIG. 1E, current proxy endpoint 218, next proxy endpoint 220 and next-next endpoint 222 can be HTTP proxy endpoint 112, SOCKS proxy endpoint 102 and datacenter proxy endpoint 104, respectively.

In the context of proxy network 100F of FIG. 1F, proxy network 100G of FIG. 1G, and proxy network 100H of FIG. H, current proxy endpoint 218, next proxy endpoint 220 and next-next endpoint 222 can be VPN proxy endpoint 110, SOCKS proxy endpoint 102 and residential proxy gateway endpoint 114, respectively.

In the pre-flow state (FIG. 2A), current proxy endpoint 218 has not established a network connection with next proxy endpoint 220 for the purpose of facilitating the flow of network packets between source computer 106 and target computer 108. Likewise, next proxy endpoint 220 has not established a network connection with next-next endpoint 222 for the purpose of facilitating the flow of network packets between source computer 106 and target computer 108.

In the bypass state (FIG. 2B), current proxy endpoint 281 has established a network connection with next-next endpoint 222 for the purpose of facilitating the flow of network packets between source computer 106 and target computer 108 through the proxy network where the network connection bypasses next proxy endpoint 220.

In the non-bypass state (FIG. 2C), current proxy endpoint 218 has established a network connection with next proxy endpoint 220 for the purpose of facilitating the flow of network packets between source computer 106 and target computer 108 through the proxy network. Likewise, next proxy endpoint 220 has established a network connection with next-next endpoint 222 for the purpose of facilitating the flow of network packets between source computer 106 and target computer 108 through the proxy network.

In the alternative pre-flow state (FIG. 2D), current proxy endpoint 218 has established a network connection with next proxy endpoint 220 for the purpose of facilitating the flow of network packets between source computer 106 and target computer 108 through the proxy network. However, the flow has not yet begun over the network connection. For example, alternative pre-flow state (FIG. 2D) may correspond to when a network tunnel from source computer 106 and target computer 108 is currently being established in the proxy network and when a network packet sent from source computer 106 or target computer 108 cannot reach the other through the proxy network.

In operation, in the pre-flow state (FIG. 2A) or the alternative pre-flow state (FIG. 2D), current proxy endpoint 218 determines whether current proxy endpoint 218 and next proxy endpoint 220 are co-located together. Proxy endpoint 218 is referred to as a "current" proxy endpoint because, in the pre-flow state and in the alternative pre-flow state, it is a proxy endpoint in the proxy network that is currently making a decision whether to bypass the next proxy endpoint 220. Such decision may be made when establishing a network tunnel through proxy network for the purpose of facilitating the flow of network packets between source computer 106 and target computer 208 through the proxy network and before that flow begins (e.g., before network packets sent from source computer 106 or target computer 108 can reach the other through the proxy network.

If current proxy endpoint 218 determines that current proxy endpoint 218 and next proxy endpoint 220 are co-located together. Then, current proxy endpoint 218 attempts to bypass next proxy endpoint 220 including subsuming the proxy operations of next proxy endpoint 220 including its network address.

For example, if SOCKS proxy endpoint 102 in context of proxy network 100A of FIG. 1A determines that SOCKS proxy endpoint 102 and datacenter proxy endpoint 104 are co-located together, then SOCKS proxy endpoint 102 attempts to bypass datacenter proxy endpoint 104 including subsuming the proxy operations of datacenter proxy endpoint 104 including the network address of datacenter proxy endpoint 104.

If the bypass attempt is successful, then the next proxy endpoint 220 is bypassed for the purpose of flowing network packets through the proxy network between source computer 106 and target computer 108, as depicted in FIG. 2B. In particular, in the bypass state (FIG. 2B), current proxy endpoint 218 performs proxy functions of both current proxy endpoint 218 and next proxy endpoint 220 using the network address of next proxy endpoint 220. By using the network address of next proxy endpoint 220 in proxy operations when in the bypass state (FIG. 2B), current proxy endpoint 218 appears to next-next endpoint 222 as if it were next proxy endpoint 220 from a source network address perspective. In other words, regardless if next proxy endpoint 220 is bypassed or not, next-next endpoint 222 still receives network packets having as the source network address the network address of the next proxy endpoint 220. Thus, the bypass reduces the number of endpoints in the proxy network through which network packets between source computer 106 and target computer 108 traverse without affecting certain network operations.

If current proxy endpoint 218 determines that current proxy endpoint 218 and next proxy endpoint 220 are co-located together and the attempted bypass is unsuccessful, then the bypass attempt may be abandoned and the resulting state of the proxy network may be the non-bypass state (FIG. 2C) where network packets flow between source computer 106 and target computer 108 through all of current proxy endpoint 218, next proxy endpoint 220 and next-next proxy endpoint 222.

If current proxy endpoint 218 determines that current proxy endpoint 218 and next proxy endpoint 220 are not co-located together, then currently proxy endpoint 218 may not attempt to bypass next proxy endpoint 220 and the resulting state is the non-bypass state (FIG. 2C). In this case, network packets transmitted between source computer 106 and target computer 108 may traverse all of current proxy endpoint 218, next proxy endpoint 220 and next-next proxy endpoint 22.

As indicated, current proxy endpoint 218 determine whether current proxy endpoint 218 and next proxy endpoint 220 are co-located together. There are at least three different co-location scenarios. One, the proxy endpoints 218 and 220 are co-located together because they use the same network interface. Two, the proxy endpoints 218 and 220 are co-located because they execute in different virtual machines but on the same hypervisor. Three, the proxy endpoints 218 and 220 are co-located because they are run on two different computer systems but are located in the proxy network behind the same router.

Current proxy endpoint 218 may determine whether one of these three co-location scenarios are present when establishing a network tunnel through the proxy network through which network packets between source computer 106 and target computer 108 will flow. This determination may be made by current proxy endpoint 218 based all of the following "co-location indicators," a subset of the following co-location indicators, or a superset thereof:

The network address of the current proxy endpoint 218 ("current proxy endpoint network address"), The network address of the next proxy endpoint 220 ("next proxy endpoint network address"), The subnet mask of the current proxy endpoint network address, The subnet mask of the next proxy endpoint network address, The routing prefix of the current proxy endpoint network address, The routing prefix of the next proxy endpoint network address, An identifier of the physical computer system that hosts current proxy endpoint 218 ("current proxy endpoint host"), An identifier of the physical computer system that hosts next proxy endpoint 222 ("next proxy endpoint host"), An identifier of a network interface which the current proxy endpoint 218 is configured to use for network communications ("current proxy endpoint NIC"), An identifier of a network interface which the next proxy endpoint 220 is configured to use for network communications ("next proxy endpoint NIC"), An identifier of a virtual machine instance on which current proxy endpoint 218 executes ("current proxy endpoint VM"), An identifier of a virtual machine instance on which next proxy endpoint 220 executes ("next proxy endpoint VM"), An identifier of a router in the proxy network which current proxy endpoint 218 is configured to send network packets for routing to other endpoints ("current proxy endpoint router"), and An identifier of a router in the proxy network which next proxy endpoint 220 is configured to send network packets for routing to other endpoints ("next proxy endpoint router").

For the above co-location indicators pertaining to next proxy endpoint 220, current proxy endpoint 218 may obtain some or all of them from next proxy endpoint 220. For example, current proxy endpoint 218 may establish a network connection with next proxy endpoint 220 and receive some or all of the co-location indicators from next proxy endpoint 220 over the network connection. In addition, or alternatively, current proxy endpoint 218 may obtain some or all of the co-location indicators pertaining to next proxy endpoint 220 from a centralized database that stores co-location indicators for proxy endpoints in the proxy network or from a centralized proxy coordinator computer system in the proxy network that provides them. Each of current proxy endpoint 218 and next proxy endpoint 220 may obtain some or all of their respective co-location indicators from a centralized database or a centralized proxy coordinator computer system in the proxy network that provides them. In addition, or alternatively, each of current proxy endpoint 218 and next proxy endpoint 220 may obtain some or all of their respective co-location indicators by way of manual configuration or manual administration of the endpoints, or current proxy endpoint 218 and next proxy endpoint 200 may obtain some or all of their respective co-location indicators by programmatically invoking a system call interface of an operating system on which the endpoint executes.

4.1 Shared Network Interface Co-Location Scenario

Figure 3A:
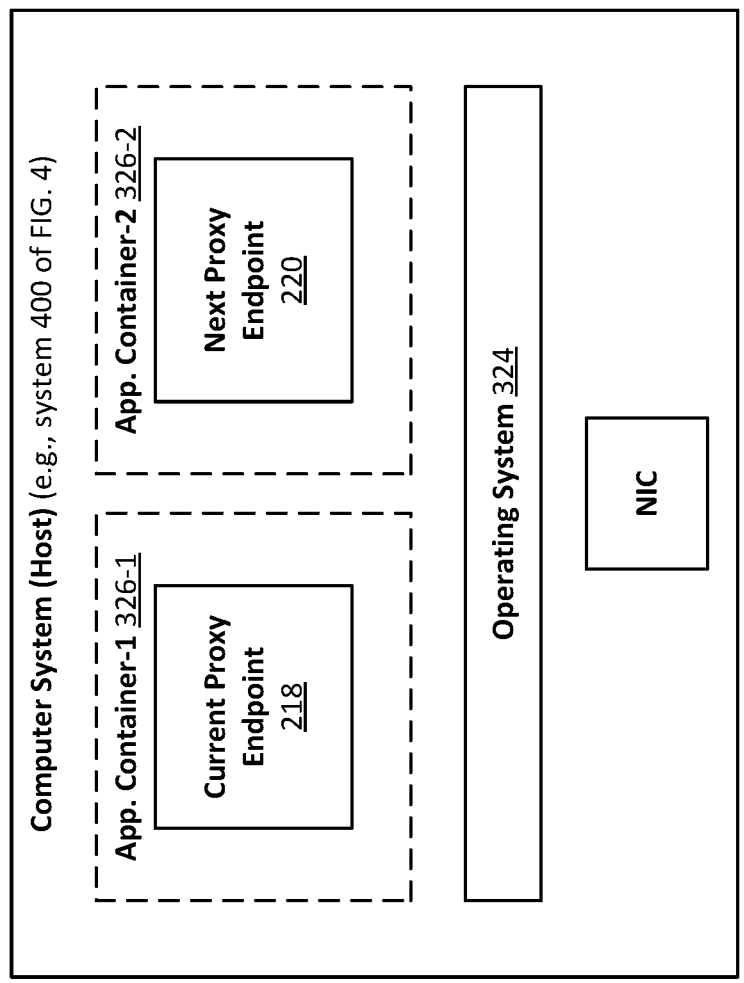
FIG. 3A depicts a scenario where proxy endpoints use the same network interface, according to some embodiments.

FIG. 3A depicts a scenario where current proxy endpoint 218 and next proxy endpoint 210 use the same network interface, according to some embodiments. Current proxy endpoint 218 and next proxy endpoint 220 execute on the same physical computer system (e.g., computer system 400 of FIG. 4). Optionally, each of current proxy endpoint 218 and next proxy endpoint 220 execute in respective application containers 326-1 and 326-2, respectively. In either case, current proxy endpoint 218 and next proxy endpoint 220 execute on operating system 324 (e.g., LINUX, WINDOWS, etc.) of computer system 400. The computer system 400 includes at least one network interface (e.g., communication interface 418 described below with respect to FIG. 4.)

Current proxy endpoint 218 can compare the current proxy endpoint host to the next proxy endpoint host to determine if current proxy endpoint 218 and next proxy endpoint 220 execute on the same host (same physical computer system). For example, if the host identifiers match, then endpoints 218 and 220 execute on the same host. If current proxy endpoint 218 and next proxy endpoint 220 execute on the same host, then current proxy endpoint 218 can compare the current proxy endpoint NIC to the next proxy endpoint NIC to determine if current proxy endpoint 281 and next proxy endpoint 220 use the same network interface (e.g., communication interface 418) for network communications (e.g., for sending and receiving network packets). For example, if the NIC identifiers match, then endpoints 218 and 220 use the same network interface. If current proxy endpoint 218 and next proxy endpoint 220 use the same network interface, then current proxy endpoint 218 attempts to bypass next proxy endpoint 220 by establishing a network connection with next-next endpoint 222 using the next proxy endpoint network address as the source network address for the next connection and for network packets sent to next-next endpoint 220 via the network connection. Since current proxy endpoint 218 and next proxy endpoint 220 share the same network interface, current proxy endpoint 218 can use the next proxy endpoint network address as a source network address in network communications with next-next endpoint 222 without having to coordinate the use with next proxy endpoint 220.

4.2 Shared Hypervisor Co-Location Scenario

Figure 3B:
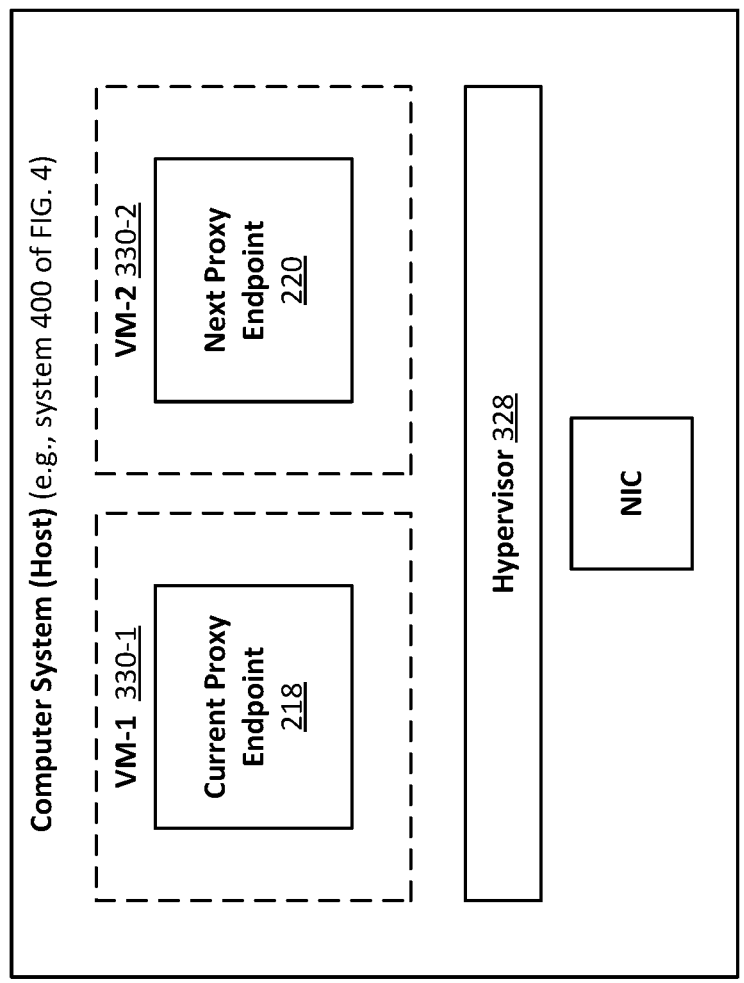
FIG. 3B depicts a scenario where proxy endpoints execute in different virtual machines but on the same hypervisor, according to some embodiments.

FIG. 3B depicts a scenario where current proxy endpoint 218 and next proxy endpoint 220 execute in different virtual machines but on the same hypervisor. Current proxy endpoint 218 and next proxy endpoint 220 execute on the same physical computer system 400. However, current proxy endpoint 218 and next proxy endpoint 210 execute in different virtual machines. In particular, current proxy endpoint 281 executes in virtual machine-1 330-1 and next proxy endpoint 220 executes in virtual machine-2 330-2. Both virtual machines 330 execute on hypervisor 328, which may be a Type-1 hypervisor, for example. Computer system 400 includes at least one network interface (e.g., communication interface 418 described below with respect to FIG. 4.)

Current proxy endpoint 218 can compare the current proxy endpoint host to the next proxy endpoint host to determine if current proxy endpoint 218 and next proxy endpoint 220 execute on the same host (same physical computer system). For example, if the host identifiers match, then endpoints 218 and 220 execute on the same host. If current proxy endpoint 218 and next proxy endpoint 220 execute on the same host, then current proxy endpoint 218 can compare the current proxy endpoint VM to the next proxy endpoint VM to determine if current proxy endpoint 281 and next proxy endpoint 220 execute in different virtual machines. For example, if the VM identifiers match, then endpoints 218 and 220 execute in the same virtual machine. In this case, current proxy endpoint 218 can bypass next proxy endpoint 220 if endpoints 218 and 220 use the same network interface, as discussed above with respect to FIG. 3A. However, if the VM identifiers do not match, then endpoints 218 and 220 execute in different virtual machines. If endpoints 218 and 220 execute in different virtual machines, then current proxy endpoint 218 can take control of the next proxy endpoint network address.

Hypervisor 328 may prevent current proxy endpoint 218 from using the next proxy endpoint network address as a source network address for network connections and network packets originating from current proxy endpoint 218. In this case, hypervisor 328 does not support an outbound connection from endpoint 218 using the IP address of endpoint 220. Therefore, a network packet manipulation agent may be installed on the hypervisor. The agent can modify the source IP address of packets outbound from the hypervisor. Endpoint 218 may be configured to notify the agent running on the hypervisor about which source IP address to modify. For example, suppose that IP-1 is assigned to endpoint 220 and endpoint 218 wants to make an outbound connection with IP-1 to a target computer. In this situation, an agent is installed on the hypervisor which hosts endpoint 218 and 220. Specifically, endpoint 218 comes up with an unused unique IP address (IP-X) from private IP ranges (as defined by IANA). Then, endpoint 218 contacts an agent on the hypervisor. Then, the endpoint asks the agent to replace IP-X with the IP-assigned to endpoint 220. Subsequently, the agent replaces all source IP addresses of IP-X to IP-1 from the network packets at the hypervisor. This replacement is restricted to the packets routed from the virtual machine on which endpoint 218 is hosted. When the proxy connection is closed, endpoint 218 notifies the agent running on the hypervisor to stop replacing IP addresses. To circumvent this prevention, network agents may execute on virtual machine 330-1 and 330-2. In particular, the network agent in virtual machine 330-1 may contact the network agent in virtual machine 330-2 via an inter-process communication mechanism and request that next proxy endpoint 220 release use of the next proxy endpoint network address. After releasing use of the next proxy endpoint network address, the network agent executing on virtual machine 330-2 may inform the network agent executing on virtual machine 330-1 via the inter-process communication mechanism of the release. Current proxy endpoint 218 may then use the next proxy endpoint process for network communications with next-next endpoint 222. Alternatively, if supported by hypervisor 328, current proxy endpoint 218 may request hypervisor 328 to release next proxy endpoint network address for use by current proxy endpoint 218. In this case, a hypervisor assigns an IP address to one virtual machine for the inbound IP connectivity. That virtual machine may "own" that IP address. However, the hypervisor may allow outbound connections from the same IP address between virtual machines. Therefore, endpoint 218 may make an outbound connection using the IP address assigned to endpoint 220.

4.3 Shared Router Co-Location Scenario

Figure 3C:
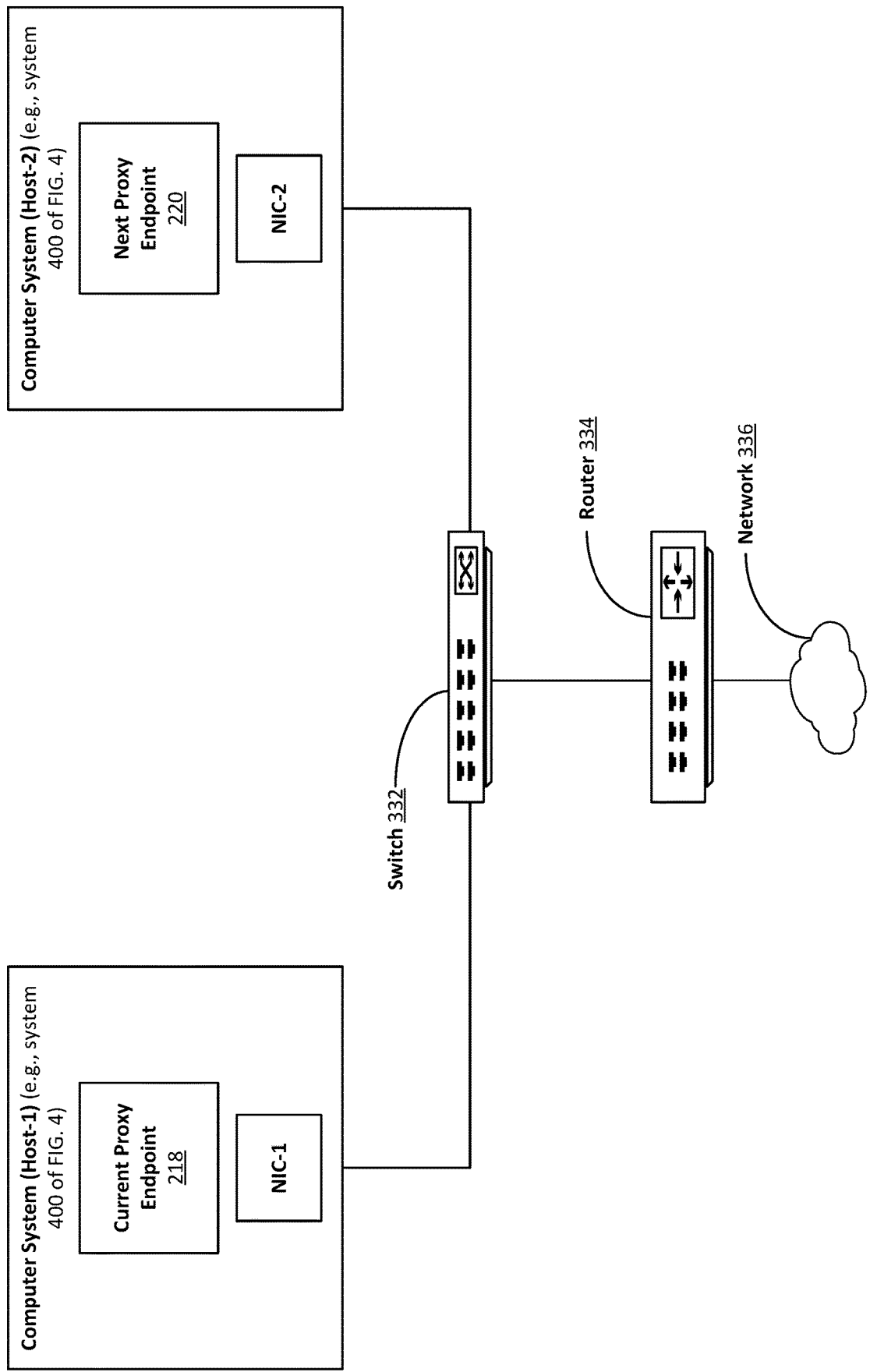
FIG. 3C depicts a scenario where proxy endpoints execute on different computer systems but are located in a proxy network behind the same router, according to some embodiments.

FIG. 3C depicts a scenario where current proxy endpoint 218 and next proxy endpoint 220 execute on different computer systems but are located in the proxy network behind the same router. Current proxy endpoint 218 executes on computer system Host-1 and next proxy endpoint 220 executes on computer system Host-2. Computer system Host-1 is connected to network switch 332 as is Host-2. Switch 332 is connected to router 334 which is connected to network 336. Network 336 is connected to other endpoints (e.g., target computer 108), possibly through one or more additional networks.

Current proxy endpoint 218 can compare the current proxy endpoint host to the next proxy endpoint host to determine if current proxy endpoint 218 and next proxy endpoint 220 execute on different computer systems. For example, if the host identifiers do not match, then endpoints 218 and 220 execute on different computer systems. If current proxy endpoint 218 and next proxy endpoint 220 execute on different computer systems, then current proxy endpoint 218 can compare the current proxy endpoint router to the next proxy endpoint router to determine if current proxy endpoint 218 and next proxy endpoint 220 share the same router (e.g., 334). For example, if the current proxy endpoint router and the next proxy endpoint router match, then endpoints 218 and 220 share the same router. Alternatively, current proxy endpoint 218 can compare the routing prefix of the current proxy endpoint network address to the routing prefix of the next proxy endpoint network address to determine if current proxy endpoint 218 and next proxy endpoint 220 share the same router. For example, if the routing prefix of the current proxy endpoint address and the routing prefix of the next proxy endpoint address match, then endpoints 218 and 220 share the same router. The routing prefix of a network address may be determined by applying a subnet mask to the network address and taking non-masked most-significant bits of the network address as the routing prefix. For example, using an IP network address as an example, the routing prefix of IP network address '192.168.2.23' with a subnet mask of '255.255.255.0' is '192.168.2' or equivalently '192.168.2.0'. In either case, if endpoints 218 and 220 share the same router, then current proxy endpoint 218 can establish a network connection with and send network packets to next-next endpoint 222 using the next proxy endpoint network address as the source network address, assuming the policy of the router (e.g., 334) is configured to allow current proxy endpoint 218 or computer system Host-1 to use the next proxy endpoint network address of a source network address. If the router policy is configured such to only allow next proxy endpoint 220 or Host-2 to use the next proxy endpoint network address, the bypass might not be possible in this case.

5. HARDWARE IMPLEMENTATION

According to some embodiments of the present approach, the techniques described herein are implemented by at least one computer system. The techniques may be implemented in whole or in part using a combination of at least one server computer or other computer systems that are coupled using a network, such as a packet data network. The computer systems may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computer systems may also combine custom hard-wired logic, ASICs, or FPGAs with custom programming to accomplish the described techniques.

The computer systems may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired or program logic to implement the described techniques, one or more virtual computing machines or instances in a data center, or a network of server computers or personal computers.

Figure 4:
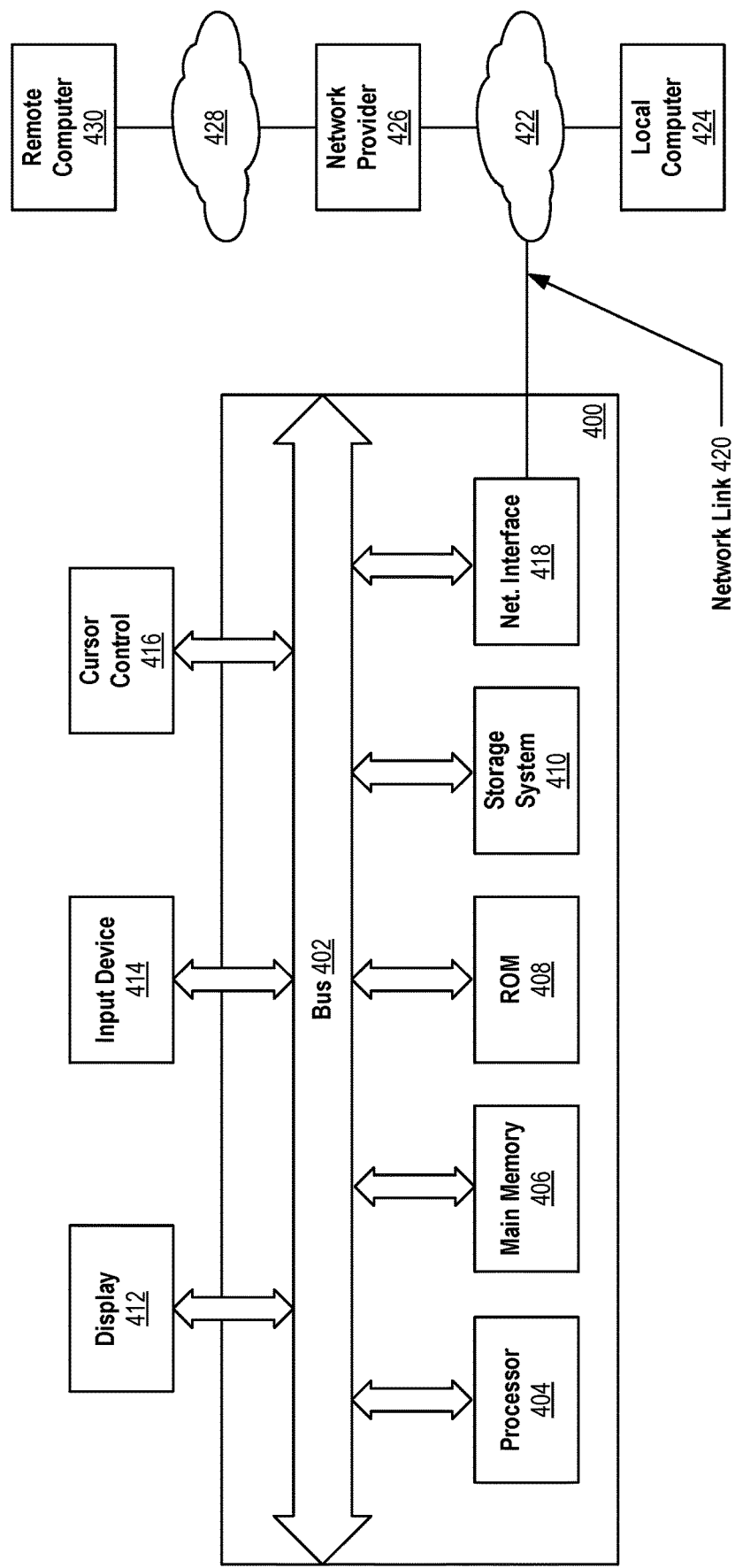
FIG. 4 is a block diagram that illustrates a computer system upon which some embodiments may be implemented.

FIG. 4 is a block diagram that illustrates an example computer system with which some embodiments may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus or other communication mechanism(s) for communicating information or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 400 may be coupled via I/O subsystem 402 to at least one output device 412. In some embodiments, output device 412 is a digital computer display. Examples of a display that may be used in some embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In some embodiments, computer system 400 may comprise an internet of things (IoT) device in which one or more of the output devices 412, input device 414, and control device 416 are omitted. In some embodiments, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware or program instructions or logic which when loaded and used or executed in combination with the computer system causes or programs the computer system to operate as a special-purpose machine. According to some embodiments, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In some embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Communication interface 418 can be based on an interconnect technology used for distributed computing systems, supercomputer systems, and high-performance computing systems. For example, communication interface 418 can be based on OMNI-PATH, INFINIBAND, ARIES, NVLINK, TOFU, or ethernet.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices or computers that are operated by an Internet Service Provider (ISP) 426. ISP 426 provides data communication services through a world-wide packet data communication network represented as internet 428.

A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or NoSQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In some embodiments, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In some embodiments, for security and reliability, an operating system may prevent direct communication between independent processes, providing strictly mediated and controlled inter-process communication functionality.

6. OTHER ASPECTS OF THE DISCLOSURE

Unless the context clearly indicates otherwise, the term "or" is used herein in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used herein in an open-ended fashion, and do not exclude additional elements, features, acts, or operations.

Unless the context clearly indicates otherwise, conjunctive language such as the phrase "at least one of X, Y and Z," is to be understood to convey that an item, term, etc. may be either X, Y or Z, or a combination thereof. Thus, such conjunctive language is not intended to imply that certain embodiments require at least one of X, at least one of Y and at least one of Z to each be present.

Unless the context clearly indicates otherwise, as used herein, the singular forms "a," "an," and "the" are intended to include the plural forms as well.

Unless the context clearly indicates otherwise, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, some embodiments of the present approach have been described with reference to numerous specific details that may vary from implementation to implementation. The specification and drawings are, accordingly, to be regarded in an illustrative rather than a restrictive sense.

The invention claimed is:

1. A computer system comprising:
one or more processors;
storage media; and
instructions stored in the storage media which, when executed by the one or more processors, cause the one or more processors to perform:
determining that a current proxy endpoint and a next proxy endpoint for facilitating network packet flow through a proxy network between a source computer and a target computer are co-located together in the proxy network;
wherein the current proxy endpoint and the next proxy endpoint are co-located if the current proxy endpoint and the next proxy endpoint if one or more happens; they both use the same network interface, or they both execute in different virtual machines but on the same hypervisor, or they both are run on two different computer systems but are in the proxy network behind the same route, and
based on the determining that the current proxy endpoint and the next proxy endpoint are co-located together in the proxy network, bypassing the next proxy endpoint while facilitating network packet flow through the proxy network between the source computer and the target computer including facilitating network packet flow through the current proxy endpoint and a next-next endpoint while bypassing the next proxy endpoints;
wherein the current proxy endpoint, the next proxy endpoint and the next-next endpoint are consecutively interposed in the proxy network between the source computer and the target computer.

2. The computer system of claim 1, further comprising instructions stored in the storage media which, when executed by the one or more processors, cause the one or more processors to perform:
determining that the current proxy endpoint and the next proxy endpoint share a network interface; and
wherein the determining that the current proxy endpoint and the next proxy endpoint are co-located together is based on the determining that the current proxy endpoint and the next proxy endpoint share the network interface.

3. The computer system of claim 1, further comprising instructions stored in the storage media which, when executed by the one or more processors, cause the one or more processors to perform:
determining that the current proxy endpoint and the next proxy endpoint execute on different virtual machines on a same hypervisor; and
wherein the determining that the current proxy endpoint and the next proxy endpoint are co-located together is based on the determining that the current proxy endpoint and the next proxy endpoint execute on different virtual machines on the same hypervisor.

4. The computer system of claim 1, further comprising instructions stored in the storage media which, when executed by the one or more processors, cause the one or more processors to perform:
determining that the current proxy endpoint and the next proxy endpoint share a same router in the proxy network; and
wherein the determining that the current proxy endpoint and the next proxy endpoint are co-located together is based on the determining that the current proxy endpoint and the next proxy endpoint share the same router in the proxy network.

5. The computer system of claim 1, wherein the current proxy endpoint is one of:
a virtual private network proxy endpoint;
an application-layer proxy endpoint in the proxy network; or
a session-layer proxy endpoint in the proxy network.

6. The computer system of claim 1, wherein the next proxy endpoint is one of:
an application-layer proxy endpoint in the proxy network;
a session-layer proxy endpoint in the proxy network;
a datacenter proxy endpoint in the proxy network; or a residential gateway proxy endpoint in the proxy network.

7. The computer system of claim 1, wherein the next-next endpoint is one of:
a datacenter proxy endpoint in the proxy network;
a residential gateway proxy endpoint in the proxy network; or
the target computer.

8. A proxy network comprising:
at least one computer system; and
a current proxy endpoint and a next proxy endpoint for facilitating network packet flow through the proxy network between a source computer and a target computer;
wherein the current proxy endpoint is configured to execute on the at least one computer system;
wherein the current proxy endpoint is configured to bypass the next proxy endpoint based on a determination that the current proxy endpoint and the next proxy endpoint are co-located together in the proxy network;
wherein the current proxy endpoint and the next proxy endpoint are co-located if the current proxy endpoint and the next proxy endpoint if one or more happens; they both use the same network interface, or they both execute in different virtual machines but on the same hypervisor, or they both are run on two different computer systems but are in the proxy network behind the same route; and
wherein the current proxy endpoint is configured to bypass the next proxy endpoint while facilitating network packet flow through the proxy network between the source computer and the target computer including facilitating network packet flow through the current proxy endpoint and a next-next endpoint while bypassing the next proxy endpoint,
wherein the current proxy endpoint, the next proxy endpoint and the next-next endpoint are consecutively interposed in the proxy network between the source computer and the target computer.

9. The proxy network of claim 8, wherein the current proxy endpoint is further configured to:
determine that the current proxy endpoint and the next proxy endpoint share a network interface; and
determine that the current proxy endpoint and the next proxy endpoint are co-located together based on a determination that the current proxy endpoint and the next proxy endpoint share the network interface.

10. The proxy network of claim 8, wherein the current proxy endpoint is further configured to:
determine that the current proxy endpoint and the next proxy endpoint execute on different virtual machines on a same hypervisor; and
determine that the current proxy endpoint and the next proxy endpoint are co-located together based on a determination that the current proxy endpoint and the next proxy endpoint execute on different virtual machines on the same hypervisor.

11. The proxy network of claim 8, wherein the current proxy endpoint is further configured to:
determine that the current proxy endpoint and the next proxy endpoint share a same router in the proxy network; and
determine that the current proxy endpoint and the next proxy endpoint are co-located together based on a determination that the current proxy endpoint and the next proxy endpoint share the same router in the proxy network.

12. The proxy network of claim 8, wherein the current proxy endpoint is one of:
a virtual private network proxy endpoint in the proxy network;
a HTTP proxy endpoint in the proxy network; or
a SOCKS proxy endpoint in the proxy network.

13. The proxy network of claim 8, wherein the next proxy endpoint is one of:
a HTTP proxy endpoint in the proxy network;
a SOCKS endpoint in the proxy network;
a datacenter proxy endpoint in the proxy network; or
a residential gateway proxy endpoint in the proxy network.

14. The proxy network of claim 8, wherein the next-next endpoint is one of:
a datacenter proxy endpoint in the proxy network;
a residential gateway proxy endpoint in the proxy network; or
the target computer.

15. A method comprising:
determining, at a current proxy endpoint, that the current proxy endpoint and a next proxy endpoint for facilitating network packet flow through a proxy network between a source computer and a target computer are co-located together in the proxy network;
wherein the current proxy endpoint and the next proxy endpoint are co-located if the current proxy endpoint and the next proxy endpoint if one or more happens; they both use the same network interface, or they both execute in different virtual machines but on the same hypervisor, or they both are run on two different computer systems but are in the proxy network behind the same route; and
based on the determining that the current proxy endpoint and the next proxy endpoint are co-located together in the proxy network, bypassing, at a current proxy endpoint, the next proxy endpoint while facilitating network packet flow through the proxy network between the source computer and the target computer including facilitating network packet flow through the current proxy endpoint and a next-next endpoint while bypassing the next proxy endpoint,
wherein the current proxy endpoint, the next proxy endpoint and the next-next endpoint are consecutively interposed in the proxy network between the source computer and the target computer.

16. The method of claim 15, further comprising:
determining, at a current proxy endpoint, that the current proxy endpoint and the next proxy endpoint share a network interface; and
wherein the determining that the current proxy endpoint and the next proxy endpoint are co-located together is based on the determining that the current proxy endpoint and the next proxy endpoint share the network interface.

17. The method of claim 15, further comprising:
determining, at a current proxy endpoint, that the current proxy endpoint and the next proxy endpoint execute on different virtual machines on a same hypervisor; and
wherein the determining that the current proxy endpoint and the next proxy endpoint are co-located together is based on the determining that the current proxy endpoint and the next proxy endpoint execute on different virtual machines on the same hypervisor.

18. The method of claim 15, further comprising:
determining, at a current proxy endpoint, that the current proxy endpoint and the next proxy endpoint share a same router in the proxy network; and
wherein the determining that the current proxy endpoint and the next proxy endpoint are co-located together is based on the determining that the current proxy endpoint and the next proxy endpoint share the same router in the proxy network.

19. The method of claim 15, further comprising:
obtaining, at the current proxy endpoint, at least one of the following co-location indicators:
a network address of the next proxy endpoint,
a subnet mask of the network address of the next proxy endpoint,
a routing prefix of the network address of the next proxy endpoint,
an identifier of a computer system that hosts the next proxy endpoint,
an identifier of a network interface which the next proxy endpoint is configured to use for network communications,
an identifier of a virtual machine instance on which next proxy endpoint executes, or an identifier of a router in the proxy network to which next proxy endpoint is configured to send network packets for routing to other endpoints; and
determining that the current proxy endpoint and the next proxy endpoint are co-located together in the proxy network based on the at least one co-location indicator.

20. The method of claim 15, further comprising:
obtaining, at the current proxy endpoint, a network address of the next proxy endpoint; and
using, at a current proxy endpoint, the network address of the next proxy endpoint as a source network address in network packets sent to the next-next endpoint while bypassing the next proxy endpoint.

* * * * *